United States Patent [19]

George

[11] 4,334,577
[45] Jun. 15, 1982

[54] VENTILATING SYSTEM FOR LIVESTOCK HOUSES

[76] Inventor: Robert M. George, 1208 W. Worley St., Columbia, Mo. 65201

[21] Appl. No.: 111,292

[22] Filed: Jan. 11, 1980

[51] Int. Cl.³ .............................................. F24H 3/02
[52] U.S. Cl. .................................... 165/54; 98/40 C; 98/119; 165/DIG. 12; 237/46
[58] Field of Search .......... 165/66, DIG. 2, DIG. 12, 165/4, 54; 98/33 R, 40 C, 119; 237/46

[56] References Cited

U.S. PATENT DOCUMENTS

| | | | |
|---|---|---|---|
| 1,975,316 | 10/1934 | Ferris | 98/119 |
| 2,862,434 | 1/1954 | Edwards | 165/DIG. 12 X |
| 3,307,469 | 3/1967 | Bohanon | 98/40 C |
| 4,171,722 | 10/1979 | Huggins | 165/119 |
| 4,184,538 | 1/1980 | Rauenhorst | 165/DIG. 12 X |

OTHER PUBLICATIONS

Cyclone International Inc., "Self Adjusting Air Inlet", Instruction Manual #60-94-003, Aug. 18, 1975.

*Primary Examiner*—Albert J. Makay
*Assistant Examiner*—Henry Bennett
*Attorney, Agent, or Firm*—Gravely, Lieder & Woodruff

[57] ABSTRACT

A ventilation system for a livestock house includes a heat exchanger through which both warm moist air from the interior living area of the house and fresh make-up air from the outside are passed, so that heat will transfer from the former to the latter. Prior to entering the heat exchanger, the warm moist air passes through a filter device that removes particulates from it, so that the particulates do not combine with condensation in the heat exchanger to block the heat exchanger. The fresh air, after being warmed in the heat exchanger passes into an elongated distribution plenum located slightly below the ceiling of the house, and this plenum contains apertures which direct the fresh air horizontally into the living area. Moreover, the upper surface of the plenum is located directly below an elongated opening in the ceiling. Along each side of this opening, baffles are hinged to the ceiling, and these baffles extend obliquely outwardly and downwardly, and contact the upper surface of the plenum at their lower edges. The arrangement is such that the warm moist air from the building is prevented from escaping through the opening and into the attic area above the ceiling, but when exhaust fans are energized to exhaust air from the living area, the air so withdrawn is replaced by air from the attic, that air passing into the living area by lifting the baffles and flowing outwardly over the horizontal upper surface of the plenum.

8 Claims, 5 Drawing Figures

VENTILATING SYSTEM FOR LIVESTOCK HOUSES

BACKGROUND OF THE INVENTION

This invention relates in general to buildings for housing livestock and, more particularly, to a ventilating system for livestock houses.

Mature farm animals are reasonably hardy and can withstand winter temperatures, but when farrowing, these animals should be provided a less hostile environment to protect the newborn. This is particularly true in the case of swine, for newborn pigs are extremely sensitive to harsh temperatures and even drafts. As a consequence, many farms have special houses designed to provide a more suitable enviroment for farrowing and nursing the newborn pigs.

Swine produce a considerable amount of heat which will maintain the typical livestock house at an acceptable temperature, even when the outdoor temperature drops as low as about 20° F. However, swine also produce odors and considerable moisture, and unless the livestock house is properly ventilated, an unhealthy condition will develop within it. The typical ventilating system consists of nothing more than fans installed in the walls of the livestock house and an opening in the ceiling. When the fans are energized, fresh air flows through the opening and then through the interior of the house so as to displace the moist and odor-laden air. This fresh air can be quite chilly and may set up drafts that are harmful to young pigs. Furthermore, if the fans are not used, the moist air from the building will rise through the opening and into the attic area where the moisture may condense and cause serious damage to the house itself. Moreover, since cold outside air is drawn directly into the building, additional heat must be supplied in the winter months to prevent the interior of the building from becoming too cold for the farm animals. At the present cost of energy, this can amount to a sizable expense.

Attempts have been made to reduce drafts by installing deflectors below the attic area and to prevent condensation in the attic area by positioning movable vanes along the openings, but the vanes tend to freeze and have not altogether been successful.

SUMMARY OF THE INVENTION

One of the principal objects of the present invention is to provide a ventilating system for livestock houses, with the ventilating system being capable of maintaining moderate temperatures within the house even when outside temperatures are quite low. Another object is to provide a ventilating system of the type stated which transfers heat by means of a heat exchanger from exhausted interior air to the fresh outside air that is drawn into the house. A further object is to provide a ventilating system in which the heat exchanger remains highly efficient and free from blockages, notwithstanding the presence of moisture and particulate-laden air within the interior of the house. An additional object is to provide a ventilating system of the type stated that controls the velocity of fresh air and directs it such that temperatures within the house remain generally uniform, and further keeps drafts near the floor, where young animals would lie, at an absolute minimum. A further object is to provide a ventilating system of the type stated that provides additional fresh air that is not heated, yet is introduced into the house at uniform velocity and without inducing significant drafts where the young animals are. Still another object is to provide a ventilating system of the type stated that is simple in construction, inexpensive, and highly durable. These and other objects and advantages will become apparent hereinafter.

The present invention is embodied in the improvement to a livestock house comprising a heat exchanger, means for exhausting warm moist air from the living area of the house through the heat exchanger and for drawing fresh air from the outside also through the heat exchanger so as to warm that outside air. In addition, a filter device is located before the heat exchanger to remove particulates from the warm moist air before it enters the heat exchanger. Beyond the heat exchanger is a distribution system which directs the warmed fresh air generally horizontally into the living area. Aside from that, the invention resides in a ventilation system including a horizontal surface that is located below an opening in a ceiling and an oblique baffle that controls the flow of air from the opening. The baffle is hinged at its upper end so as to swing outwardly at its lower end and thereby allow air to escape from the space between the lower edge of the baffle and the horizontal surface. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur—

DETAILED DESCRIPTION

Figure 1:
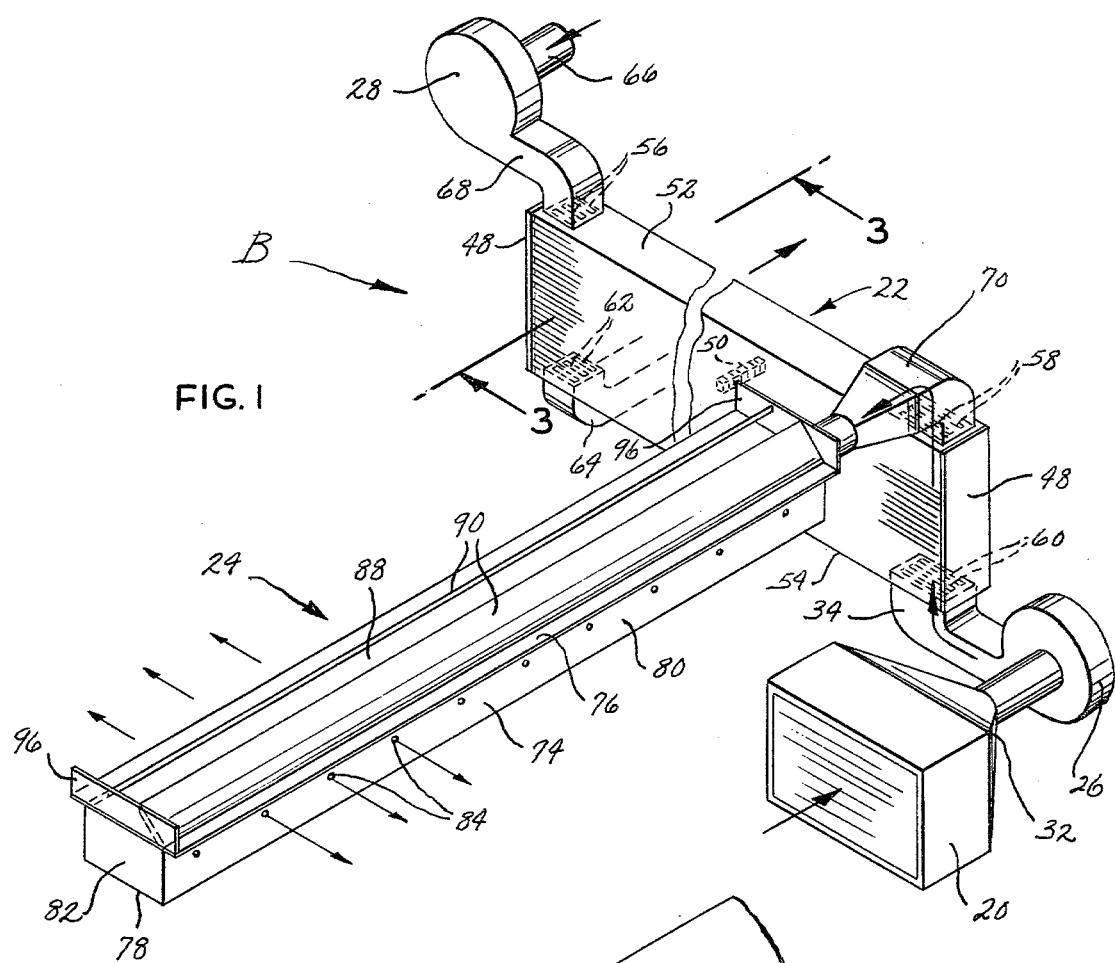
FIG. 1 is a perspective view of the ventilating system of the present invention.

Referring now to the drawings, A (FIG. 2) designates a livestock house that is particularly suited for farrowing and nursing purposes in that it is equipped with a ventilating system B (FIG. 1) that supplies fresh air at moderate temperatures and without inducing harmful drafts. The ventilating system B also permits cold outside air to enter the building A without having been heated so as to reduce the temperature of the interior of the house A, this also being achieved without creating harmful drafts. Finally, the ventilating system B prevents moist air that is within the house A from escaping into areas of the house where moisture might condense and damage the house A.

The building A (FIG. 2), apart from the ventilating system B, is conventional and includes the usual side walls 2, end walls 4, a gable roof 6 supported by the walls 2 and 4, and a ceiling 8 that extends horizontally between the walls 2 and 4 below the roof 6. Indeed, the roof 6 and ceiling 8 enclose an attic 10 that is ventilated to the exterior of the building by roof vents 12 or other suitable ventilating devices. The walls 2 and 4 together with the ceiling 8, on the other hand, enclose an interior living area 14 in which livestock is housed and extending across this living area 14 is a floor 16 which may be poured concrete. The ceiling 8 should contain insulation to prevent excessive loss of heat to the attic 10, and the walls 2 and 4 should likewise be insulated.

The ventilating system B (FIG. 1) basically includes an air filter device 20 for removing particulate matter from air derived from the living area 14, a heat exchanger 22 for transferring heat from air that is exhausted from the interior of the house A to fresh air that is derived at the exterior of the building A, and an air distribution system 24 that both distributes the heated air from the heat exchanger 22 as well as unheated fresh air from the attic 10. In addition, the ventilating system B includes a high pressure fan 26 that causes interior air that is to be exhausted to flow through the air filter device 20 and the heat exchanger 22 and to thereafter be discharged at the exterior of the house A, and another high pressure fan 28 that causes fresh air derived from outside the house A to flow through the heat exchanger 22 and into the distribution system 24, from which it is directed generally horizontally into the living area 14 of the building A. Finally, the ventilating system B includes exhaust fans 30 (FIG. 2) which are located in the walls 2 and 4 of the building A and exhaust air from the interior living area 14 directly to the exterior of the building A. In so doing, they draw fresh air into the living area 14, through the distribution system 24, that air being derived primarily from the attic 10.

Considering first the air filter device 20 (FIG. 1), it is located downstream from both the high pressure fan 26 and the heat exchanger 22, its purpose being to remove particulate matter from the warm moist air that subsequently passes through the heat exchanger 22. In this regard, the air within the living area 14 is so laden with moisture that some of the moisture will condense upon the cold surfaces of the heat exchanger 22. If the air that passes through the heat exchanger 22 also contains a significant amount of dust of the type commonly associated with livestock, the dust and moisture will combine to form a hard deposit or scale on the surfaces of the heat exchanger 22, and these deposits will not only impair the efficiency of the heat exchanger 22, but will eventually block it. Preferably the air filter device 20 is of the electrostatic variety, and its inlet should be located near the ceiling 8, and generally remote from the distribution system 24 that extends along the ceiling 8.

The high pressure fan 26 (FIG. 1) is located immediately downstream from the air filter device 20, the two being connected by a transition duct 32. The fan 26 draws air through the filter device 20 and discharges that air into a duct 34 which leads into the heat exchanger 22.

Figure 2:
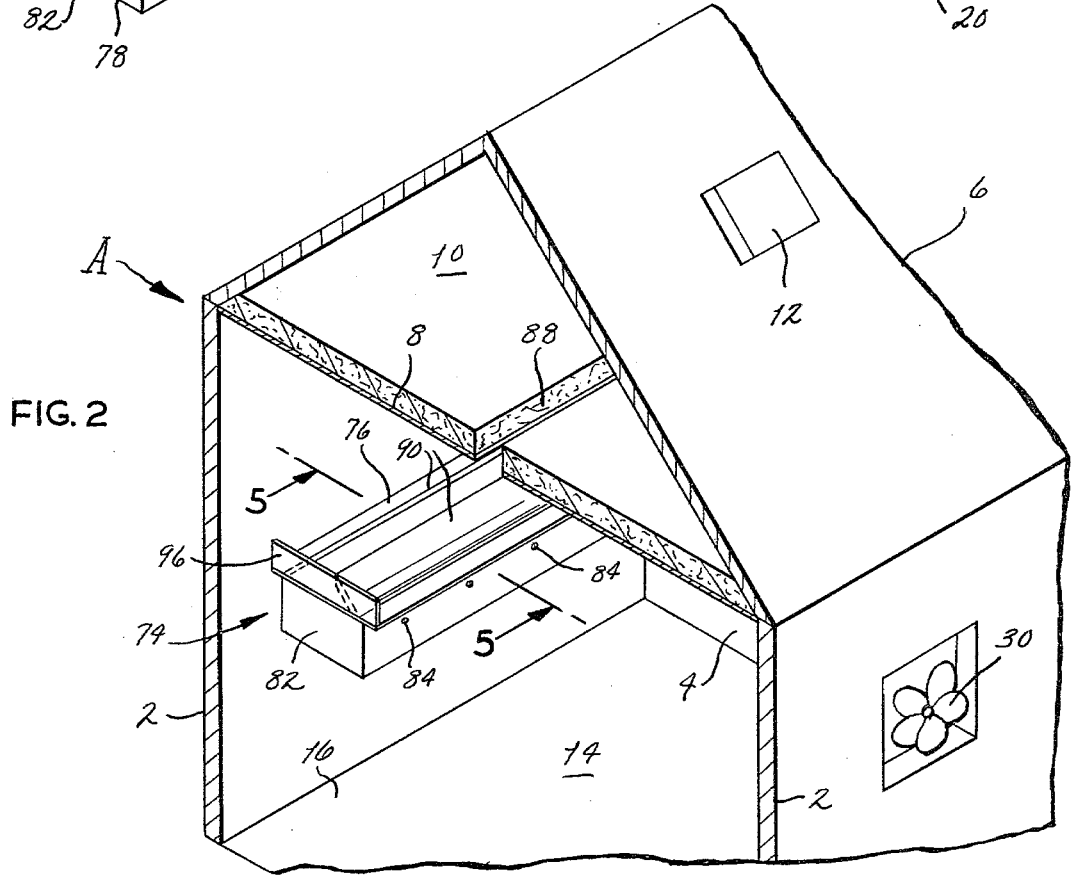
FIG. 2 is a perspective view of a livestock house, partially broken away and in section, and showing the air distribution system of the ventilating system.
Figure 3:
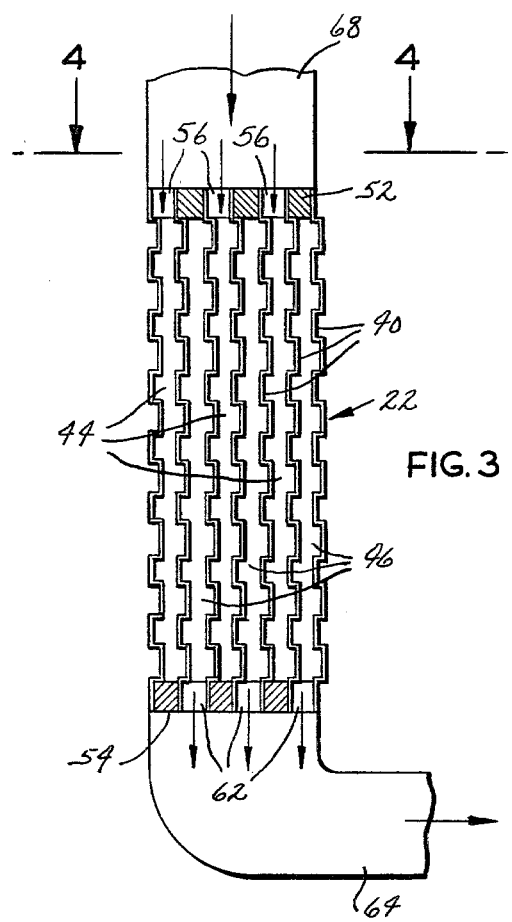
FIG. 3 is a sectional view of the heat exchanger for the ventilating system taken along line 3—3 of FIG. 1.
Figure 4:
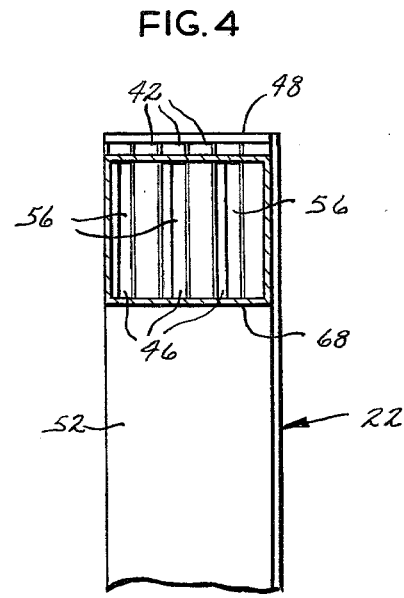
FIG. 4 is a sectional view taken along line 4—4 of FIG. 3 and showing one of the inlets into the heat exchanger.

The heat exchanger 22 (FIGS. 1, 3 and 4) is preferably suspended from the ceiling 8 near one end of the distribution system. It consists of several parallel sheets or panels 40 of metal such as the type commonly used for roofing, each panel 40 measuring about 1×10 feet. The panels 40 at their ends are separated by spacers 42 (FIG. 4), which are about ¼ inches thick and serve to divide the interior of the heat exchanger 22 into alternate intake and exhaust channels 44 and 46 (FIG. 3). In other words, between adjacent panels 40 there exists either an intake channel 44 or an exhaust channel 46, with the intake channels 44 and exhaust channels 46 alternating across the heat exchanger 22 so that successive intake channels 44 are separated by exhaust channels 46 and vice-versa. Moreover, the spacers 42 follow the contour or corrugations of the panels 40 and are otherwise fitted tightly enough to prevent air from escaping at the ends of the channels 44 and 46. The end edges of the panels 40 as well as the spacers 42 at those end edges are capped by end plates 48 (FIGS. 1 and 4). Intermediate their ends, adjacent panels 40 of the heat exchanger 22 are separated by additional spacers 50, but these spacers are very short so that they do not significantly impede the flow of air through the channels 44 and 46. Nevertheless they maintain the proper spacing between adjacent panels 40.

Fitted to the parallel upper edges of the panels 40 is a top wall 52 (FIGS. 1 and 3), and likewise fitted to the bottom edges is a bottom wall 54. Indeed, the walls 52 and 54 are sealed against the longitudinal edges of the panels 40 so that air will not flow across those edges, and this of course further serves to isolate the intake channels 44 from the exhaust channels 46. At its one end the top wall 52 is provided with inlet apertures 56 (FIG. 1) which open only into the intake channels 44, while at its opposite end it is provided with discharge apertures 58 which open only out of the intake channels 44. Similarly, the bottom wall 54 has inlet and discharge apertures 60 and 62, respectively, but these apertures open only into the exhaust channels 46 of the heat exchanger 22. Moreover, the inlet apertures 62 for the exhaust channels 46 are at the same end of the heat exchanger 22 as the discharge apertures 58 for the intake channels 44, so that air flows through the channels 44 and 46 in opposite directions. In other words, the heat exchanger 22 operates on the counterflow principle. The inlet apertures 56 and 60 and the discharge apertures 58 and 62 may be located in the end walls 48, instead of the top and bottom walls 56 and 54, to reduce the height of the heat exchanger 22.

The duct 34 that extends from the high pressure exhaust fan 26 is connected to the inlet apertures 60 in the bottom wall 54. The discharge apertures 62 in the bottom wall 54, are on the other hand, connected to a duct 64 (FIG. 1) that terminates outside of the livestock house A. Thus, the fan 26 forces the filtered air through the duct 34, then through the exhaust channels 46 of the heat exchanger 22 where it warms the panels 40, and finally through the duct 64 which exhausts the filtered air to the atmosphere.

As to the intake channels 44 of the heat exchanger 22, the high pressure intake fan 28 derives fresh air from the exterior of the house A, drawing that air in through a duct 66 (FIG. 1) and discharging it into another duct 68 that is connected with the top wall 52 at the inlet apertures 56 in that wall. The discharge apertures 58 in the top wall 52 on the other hand open into a duct 70 that leads to the distribution system 24. Thus, the fresh air that the fan 28 forces into the distribution system 24 is warmed as it passes along the heated panels 40 that form the sides of the intake channels 44 in the heat exchanger 22.

Figure 5:
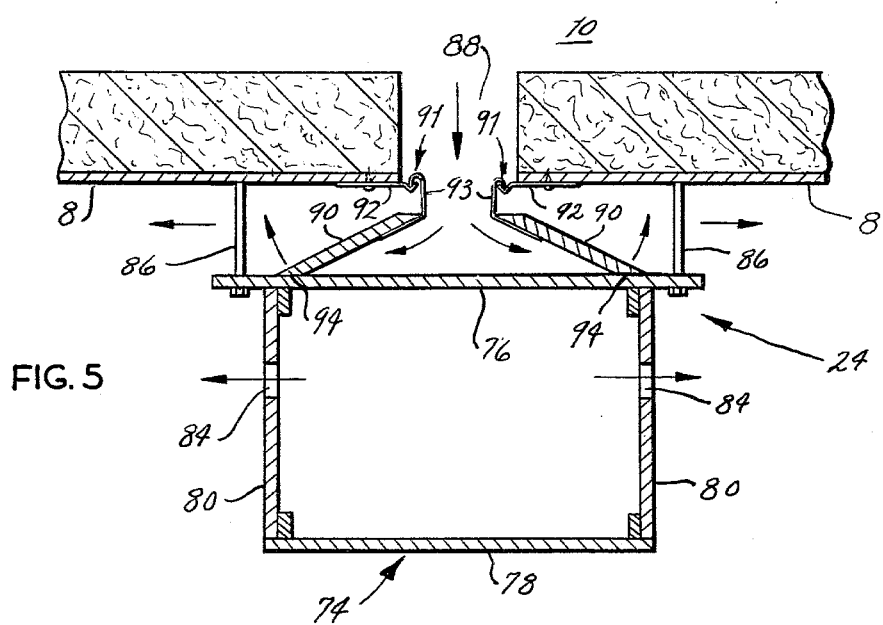
FIG. 5 is a sectional view taken along line 5—5 of FIG. 2 and showing the air distribution system in cross section.

The distribution system 24 (FIGS. 1, 2 and 5) is likewise suspended from the ceiling 8 and extends for most of the length of the livestock house A midway between the sidewalls 2. It includes a long box-like plenum 74 that is enclosed by a top wall 76, a bottom wall 78, and side walls 80 (FIG. 5). The top and bottom walls 76 and 78 are wider than the side walls are high, so in cross section the plenum 74 is rectangular, having its major cross-sectional axis parallel to the ceiling 8. One end of the plenum 74 is entirely closed by an end wall 82, while the end wall 82 at the other end is connected with the connecting duct 70 leading from the heat exchanger 22. Each side wall 80 has a series of relatively small circular apertures 84 (FIGS. 1 and 2) extended along it, these apertures being preferably about 1 inch in diameter and spaced about 8 inches apart. Moreover, the top wall 76 extends somewhat beyond the side walls 80 (FIG. 5), and the plenum 74 is suspended from the ceiling 8 along these outwardly projecting portions by tie rods 86 that extend into the ceiling 8 to which they are anchored. Preferably, the tie rods 86 support the plenum 74 with its top wall 76 parallel to the ceiling 8 and spaced about 4 inches below it.

The ceiling 8 contains an elongated opening 88 (FIGS. 2 and 5) that is centered above the top wall 76 of the plenum 74, and while it is about the same length as the top wall 76, it is considerably narrower. Indeed the width of the opening 88 should range between 10% and 30% of the width of the top wall 76. The ceiling opening 88 opens directly into the attic 10 of the livestock house A, so that fresh air from the attic 10 may enter the living area 14 when the opening 88 is not blocked. In this regard, it must be recalled that the attic 10 is vented to the atmosphere through the roof vents 12. However, hot air rises, and unless the house A is maintained at a negative pressure, the warm humid air from the living area 14 will rise into the attic 10 where the moisture within it will condense and cause damage in the attic area. In addition, when the house A is placed under a negative pressure, the cold attic air will pour through opening 88 and create excessive drafts in the living area 14. To overcome these problems, the distribution system 24 is provided with baffles 90 that in effect extend between the side margins of the opening 88 and the upper surface of top wall 76 for the air plenum 74. Moreover, the baffles 90 are hinged to the ceiling 8 along the two side margins of the opening 88, and diverge outwardly therefrom such that they are disposed at oblique angles with respect to the top wall 76 of the plenum 74. The oblique angle, measured with respect to the horizontal, should range between 30° and 60° and should preferably be 45°.

The baffles 90 are made from a rigid light weight material such as polyurethane, and along their upper margins they are provided with light weight hinges 91 which are also attached to the ceiling 8 along the side edges of the opening 88. The hinges 91 permit the baffles 90 to swing upwardly away from the plenum 74. Each hinge 91 consists of a fixed element 92 that is attached to the ceiling 8 and a movable element 93 that is attached firmly to one of the baffles 90. The fixed elements 92 project inwardly beyond the inner margins of the ceiling opening 88 and reduce the effective size of that opening. Each is provided with a V-shaped groove that opens upwardly and extends the full length of the opening 88. The movable element 93 projects upwardly from the undersides of their respective baffles 90 past the inner margins of the fixed elements 92, above which they double back upon themselves and project into the V-shaped grooves of the fixed elements 92. Indeed, the double-backed portions contact the grooves along knife edges. This not only reduces friction, but also provides a very effective seal at the hinges 91. The hinges 91 may also be conventional pin-type hinges, having their leaves made from a light weight metal such as aluminum.

The lower margin of each baffle 90 is beveled to provide a sealing surface 94 that seats snugly against the top wall 76 of the plenum 74. When so seated, the surfaces 94 contact the top wall 76 inwardly from the side margins of that wall, and indeed the spacing between the area of contact, that is the outer edge of a baffle 90, and the outwardly presented side margins of the top wall should be no less than about 2 inches. Moreover, in this condition the angle between the baffles 90 and the top wall 76 should range between 30° and 60° and should preferably be 45°. At the two ends of the top wall 76, the generally trapezoidal areas representing spaces between the baffles 90 on each side of the opening 88 are closed by end walls 96 that extend between the top wall 76 of the plenum 74 and the ceiling 88. The end walls 96 are secured permanently in position and prevent air from transferring between the attic 10 and living area 14 when the baffles 90 are closed, yet they do not interfere with the movement of the baffles 90.

Should a slight pressure differential occur across the baffles 90, as will be the case if the exhaust fans 30 are energized, the baffles 90 will pivot upwardly on their respective hinges 91. In this regard, the entire weight of each baffle 90 may be considered to be concentrated at the centroid of the baffle 90, and that weight of course creates a moment about the axis of the hinge 91. The static pressure resulting from the pressure differential acts upon the entire inner surface area of the baffle 90, creating a moment that opposes the weight moment. Indeed, the moment derived from the static pressure is sufficiently great to raise the baffle 90 until the two moments come into equilibrium. Thus, the higher pressure air from behind the baffle 90 discharges through the space between the sealing surface 94 on the baffle 90 and the top wall 76 of the plenum 74 as a jet of air, the velocity of which determines how far into the living area 14 it will pass before decaying. The weight of the baffle 90 is such that the jet of air decays before reaching the side wall 2 of the house A. This prevents drafts from developing at the floor 16.

The oblique disposition of each baffle 90 affords a large surface area to which the static pressure is applied, thus increasing the force exerted by that pressure. Furthermore, normal movement of the baffle 90 does not significantly change the location of the centroid, at least with respect to its ability to produce a moment about the axis of the hinge 91, and as a consequence, the static pressure on the baffle 90 remains relatively constant, despite wide variations in the volume of the air flow. Also the arrangement has aerodynamic characteristics that impart a smooth or laminar flow to the air passing between the baffle 90 and the top wall 76 of the plenum 74. In short, the oblique disposition of the baffles 90, enables the air to discharge in a smooth flow and at relatively constant velocity despite wide fluctuations in the volume of the air flow.

The high pressure fans 26 and 28 which force air through the heat exchanger 22, as well as the exhaust fans 30 in the side and end walls 2 and 4 are energized through a control system which is responsive to the temperature within the living area 14 of the livestock house A. The arrangement is such that the high pressure fans 26 and 28 are always operated in unison and are normally in operation when the heat derived from the animals falls short of maintaining the temperature within the living area 14 at a predetermined value. The capacity of the fans 26 and 28 is such as to provide a minimum amount of ventilation within the house, that is to say, sufficient ventilation to maintain healthy living conditions within the house A.

The exhaust fans 30 have much greater capacity, at least when all are in operation, and accordingly cause a substantially larger amount of fresh air to flow through the living area 14. The control system brings the fans 30 into operation when outside temperatures are somewhat warmer so as to prevent the heat of the animals from elevating the living area 14 to uncomfortable and unhealthy temperatures. Indeed, the control system energizes the exhaust fans 30 sequentially, with the first fan being energized when the heat generated by the animals is sufficient to elevate the living area 14 above the predetermined temperature and the greatest number being in operation when outdoor temperatures are the highest.

OPERATION

First considering the minimum ventilation supplied through the heat exchanger 22 (FIG. 1), the high pressure fan 26 draws air from the living area 14 into the filter 20 where dust and other particulates are removed from the air. The filtered air then flows through the inlet apertures 60 in the bottom wall 54 of the heat exchanger 22, whereupon the air enters the exhaust channels 46 and flows to the discharge apertures 62 and thence through the duct 68 which discharges the warm moist air at the exterior of the house A. In passing through the heat exchanger 22 the air from the living area 14 warms the panels 20 that separate the exhaust channels 46 from the intake channels 44. Should any condensation occur on the panels 40 within the exhaust channels 46, no blockages will result because the exhausted air is free from particulates which might otherwise combine with the condensation to form a scale on the panels 40.

The other high pressure fan 28, on the other hand, draws fresh air from the exterior of the house A and forces that air into the inlet apertures 56 in the top wall 52 of the heat exchanger 22. This fresh air flows through the intake channels 44 and leaves the heat exchanger 22 through the discharge apertures 58, whereupon it flows into the duct 70 and thence to the plenum 74 which is accordingly pressurized. Of course, in passing through the heat exchanger 22 the fresh air from outside the house A is heated to a temperature which is reasonably comfortable for the animals. The warmed fresh air that pressurizes the plenum 74 escapes from the plenum 74 through the circular apertures 84 in its side walls 80, it being directed from the plenum 74 in the form of jets which flow parallel to the ceiling 8 for a substantial distance, but decay before reaching the side walls 2. This sets up circulation patterns which are free from drafts that may be harmful to newborn animals at the floor 16 of the house A.

The fans 26 and 28 continue to operate as long as minimum ventilation is required, and this is usually in periods of extremely cold outdoor temperatures when the heat generated by the animals is less than that necessary to maintain a predetermined temperature within the living area 14.

Should the heat from the animals elevate the temperature within the living area 14 above the predetermined value, then the control system will energize the exhaust fans 30 located in the side and end walls 2 and 4, these fans being energized sequentially with the number in operation being dependent to a large measure on the temperature of the outside air. In any event, the exhaust fans 30 reduce the pressure within the house A and as a consequence make-up air flows into the house through the only available opening which is the opening 88 in the ceiling 8. In particular, air from the attic 10 of the house A flows downwardly through the opening 88 and along the upper surface on the top wall 76 of the plenum 74. The pressure differential across the baffles 90 forces the lightweight baffles 90 upwardly so that a small slit exists between the sealing surfaces 94 at the lower edge of the baffles 90 and the top wall 76 of the plenum 74. The width of this slit depends upon the volume of air descending through the opening 88, and that in turn depends upon the number of exhaust fans 80 that are in operation. Irrespective of the number of fans 80 that are operating, the flow of fresh make-up air along the upper surface of the top wall 76 will be smooth and will not vary significantly in velocity. This derives primarily from the angular or oblique disposition of the baffles 90. Moreover, the fresh make-up air after passing beyond the baffles 90 is still given direction by the top wall 76 so that it is maintained in a jet stream which flows generally horizontally. This jet stream continues beyond the side edges of the top wall 76 but eventually decays before it reaches the side walls 2 of the livestock house A. Like the heated fresh air derived from the interior of the plenum 74, the make-up air that is derived from the attic 10 does not produce harmful drafts, but instead sets up a gentle circulation which is sufficient to maintain comfortable living conditions in the livestock house A.

In this regard, it should be recognized that the means for providing the full ventilation, that is the exhaust fans 30 along with the ceiling opening 88, the baffles 90 and the horizontal surface formed by the top wall 76 of the plenum 74, may be utilized without the heat exchanger 22 for providing draft free ventilation in localities where only moderate outdoor temperatures are experienced.

This invention is intended to cover all changes and modifications of the example of the invention herein chosen for purposes of the disclosure which do not constitute departures from the spirit and scope of the invention.

What is claimed:

1. In combination with a livestock house having a ceiling, a living area for livestock beneath the ceiling, and fans for exhausting air from the living area, an improved ventilation system comprising: an elongated opening in the ceiling; a horizontal surface directly below the opening, and a rigid and generally flat baffle located adjacent to the opening and extended downwardly toward the horizontal surface at an oblique angle, the baffle being hinged along its upper edge with respect to the ceiling so that it can swing outwardly from a closed position, in which its lower edge is against the horizontal surface, to open positions, in which its lower edge is elevated above the horizontal surface, the baffle, when in its closed position, isolating the opening from the living area so that warm moist air in the living area will not rise through the opening and, when in its open position, permitting air from the opening to escape into the living area through the space between the lower edge and the horizontal surface, the material of the baffle being for the most part rigid and light weight and also being distributed such that normal movement of the baffle does not significantly change the length of the moment arm created by the weight of the baffle acting about the hinge axis, the inclination of the baffle being such that the lower edge is ahead of the upper edge in terms of the direction of the air that flows from the opening into the living area, the lower edge of the baffle further being located inwardly from the edge of the horizontal surface so that air after passing beyond the lower edge still flows along the horizontal surface, whereby when the exhaust fans are energized, a pressure differential occurs across the baffle and this differential causes the baffle to swing upwardly to allow air from the opening to escape into the living area, with the velocity of the air having relatively little variation over wide fluctuations in the volume of the air flow.

2. The structure according to claim 1 wherein a different baffle exists along both sides of the opening.

3. In combination with a livestock house having side and end walls, a pitched roof, and a horizontal ceiling below the roof, the ceiling together with the roof enclosing an attic and together with the side walls enclosing a living area for housing livestock, and fans for exhausting air from the living area, an improved ventilation system for supplying fresh air to and removing stale air from the living area, said ventilation system comprising a heat exchanger having intake channels and exhaust channels which are separated by heat conducting members; means defining an elongated opening in the ceiling; an elongated distribution plenum located close to but being spaced from the ceiling, the plenum being connected to the intake channels of the heat exchanger, the plenum having a generally horizontal upper surface that is located directly below the opening in the ceiling and also having apertures that are directed such that air which is introduced into the plenum will flow out of the plenum generally horizontally; rigid baffles located between the ceiling and the upper surface of the plenum along each side of the opening, the baffles being hinged to the ceiling along their upper edges and normally contacting the upper surface of the plenum along their lower edges to isolate the opening from the living area and thereby prevent warm moist air in the living area from rising into the attic through the opening, the baffles being oriented obliquely with respect to the upper surface of the plenum such that the lower edges of the baffles along each side of the opening are spaced farther apart than the upper edges, the weight and angle of inclination of the baffles being such that a slight decrease in air pressure within the living area will cause the baffles to pivot at their hinge connections and swing upwardly to provide a space between the lower edges of the baffles and the upper surface of the plenum so that fresh air will flow from the attic, through the space, and into the living area, the material of the baffles being for the most part rigid and light weight and also being distributed such that normal movement of the baffles does not significantly change the lengths of the moment arms created by the weight of the baffles acting about the hinge connections for the baffles; first air delivery means for causing air from the living area to flow through the exhaust channels of the heat exchanger and to thereafter be discharged at the exterior of the building; second air delivery means for deriving fresh air at the exterior of the building and causing that air to flow through the intake channel of heat exchanger and thence into the plenum such that the fresh air to a limited measure pressurizes that interior of the plenum, whereby the fresh air is heated by the exhaust air within the heat exchanger and is thereafter discharged from the plenum horizontally into the living area.

4. The structure according to claim 3 wherein the lower margins of the baffles contact the upper surface of the plenum substantially inwardly from the outer edges of the plenum so that the upper surface of the plenum serves to direct air from the ceiling opening generally horizontally into the living area of the house.

5. The structure according to claim 3 wherein the plenum is rectangular in cross section and the apertures are in its side walls.

6. The structure according to claim 3 and further comprising a filter connected with the exhaust channel of the heat exchanger such that the air from the living area passes through the filter before entering the heat exchanger, the filter being capable of removing particulates from the air that passes through it.

7. The structure according to claim 1 wherein the baffle is oriented at an angle of between about 30° and about 60° with respect to the horizontal.

8. The structure according to claim 3 wherein the plenum is located generally midway between the sides of the living area.

* * * * *